(12) United States Patent
Fujiki et al.

(10) Patent No.: US 10,372,664 B2
(45) Date of Patent: Aug. 6, 2019

(54) HOST-SIDE TRANSCEIVER DEVICE AND TRANSCEIVER SYSTEM

(71) Applicant: THINE ELECTRONICS, INC., Tokyo (JP)

(72) Inventors: Rei Fujiki, Tokyo (JP); Ryo Takeuchi, Tokyo (JP); Takayuki Murakami, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/737,946

(22) PCT Filed: Jun. 25, 2015

(86) PCT No.: PCT/JP2015/068378
§ 371 (c)(1),
(2) Date: Dec. 19, 2017

(87) PCT Pub. No.: WO2016/208038
PCT Pub. Date: Dec. 29, 2016

(65) Prior Publication Data
US 2018/0173671 A1 Jun. 21, 2018

(51) Int. Cl.
*G06F 13/42* (2006.01)
*G06F 13/40* (2006.01)
(Continued)

(52) U.S. Cl.
CPC ...... *G06F 13/4291* (2013.01); *G06F 13/4045* (2013.01); *H04L 12/40* (2013.01); *G06F 2213/0016* (2013.01); *H04B 10/40* (2013.01)

(58) Field of Classification Search
CPC .................. G06F 13/4291; G06F 2213/0016
(Continued)

(56) References Cited

U.S. PATENT DOCUMENTS 8,010,724 B2 8/2011 Wortham et al.
2006/0129370 A1 6/2006 Unger
(Continued)

FOREIGN PATENT DOCUMENTS

JP 096715 A 1/1997
JP 2001057567 A 2/2001
(Continued)

OTHER PUBLICATIONS

International Preliminary Report on Patentability dated Jan. 4, 2018 from the International Bureau in counterpart International Application No. PCT/JP2015/068378.
(Continued)

*Primary Examiner* — Christopher B Shin
(74) *Attorney, Agent, or Firm* — Sughrue Mion, PLLC

(57) ABSTRACT

A first communication unit 21 of a host-side transceiver device 20 performs communication based on an I²C communication scheme with a host device 10 and receives an access request signal sent from the host device 10. A second communication unit 22 performs communication based on a communication scheme different from the I²C communication scheme with a remote-side transceiver device 30 and sends the access request signal received by the first communication unit 21 to the remote-side transceiver device 30. The first communication unit 21 notifies the host device 10 that the first communication unit 21 has received the access request signal sent from the host device 10 before the access to the remote device 40 based on the access request signal sent from the second communication unit 22 ends.

5 Claims, 2 Drawing Sheets

(51) Int. Cl.
*H04L 12/40* (2006.01)
*H04B 10/40* (2013.01)

(58) Field of Classification Search
USPC .......................................................... 710/110
See application file for complete search history.

(56) References Cited

U.S. PATENT DOCUMENTS

| | | |
|---|---|---|
| 2006/0206636 A1 | 9/2006 | McLeod |
| 2010/0194996 A1* | 8/2010 | Vergoossen ....... H04L 29/12028 |
| | | 348/725 |
| 2011/0082955 A1 | 4/2011 | Wortham et al. |
| 2012/0331194 A1 | 12/2012 | Crumlin |

FOREIGN PATENT DOCUMENTS

| | | | |
|---|---|---|---|
| JP | 2005286407 A | 10/2005 | |
| JP | 2006210992 A | 8/2006 | |
| JP | 2010502046 A | 1/2010 | |
| JP | 2010166309 A | 7/2010 | |
| WO | 2008020401 A2 | 2/2008 | |
| WO | 2013122814 A1 | 8/2013 | |

OTHER PUBLICATIONS

Communication dated Jul. 18, 2017, issued by the Japan Patent Office in counterpart Japanese Application No. 2014-117678.
International Search Report dated Sep. 1, 2015, issued by the International Searching Authority in counterpart International Application No. PCT/JP2015/068378.
Extended European Search Report dated Jan. 31, 2019 issued by the European Patent Office in counterpart application No. 15896360.3.

* cited by examiner

… (1)

HOST-SIDE TRANSCEIVER DEVICE AND TRANSCEIVER SYSTEM

CROSS REFERENCE TO RELATED APPLICATIONS

This application is a National Stage of International Application No. PCT/JP2015/068378, filed Jun. 25, 2015, the contents of which are incorporated herein by reference in its entirety.

TECHNICAL FIELD

The present invention relates to a host-side transceiver device that receives, from a host device, an access request signal for requesting access to a remote device from the host device and sends the access request signal to a remote-side transceiver device that performs communication with the remote device, and a transceiver system including the host device, the host-side transceiver device, the remote-side transceiver device, and the remote device.

BACKGROUND ART

An inter-integrated circuit ($I^2C$) communication scheme using a serial bus is known. The $I^2C$ communication scheme is suitably used in a case in which a communication distance is short (for example, 1 m or less) and a communication speed is slow (for example, 100 kbps or 400 kbps) as in communication between a low-speed peripheral device and a motherboard, communication between devices on a common board, or the like. The $I^2C$ communication scheme is adopted in many systems due to its simple structure, low cost, ample track record, and the like. The $I^2C$ communication scheme may be referred to as a 2-wire serial interface.

When communication based on the $I^2C$ communication scheme is performed between two devices, one of the two devices is a master device and the other is a slave device. The master device and the slave device are connected by two bidirectional open drain signal lines (an SCL line and an SDA line) pulled up by a resistor, and communication between both of the devices is performed under an initiative of the master device. In the $I^2C$ communication scheme, a plurality of slave devices can be connected to one master device.

The master device sends a clock to the SCL line and also sends a write request signal together with an address and data to the SDA line such that data can be written to the slave device corresponding to the address. Further, the master device sends the clock to the SCL line and also sends a read request signal together with the address to the SDA line, such that data can be read from the slave device corresponding to the address. In this case, after the master device transmits the read request signal, the master device receives the data sent from the slave device. Hereinafter, the write request and the read request are collectively referred to as an access request.

When it takes time to perform a process based on the access request signal in the slave device, the slave device can cause the master device to wait before sending of the next access request signal to the slave device, by setting the SCL line to a low level. This is referred to as a clock-stretching. Since communication is possible even when a clock-stretching specification is not supported, not all $I^2C$ compliant devices supports the clock-stretching specification.

Since the $I^2C$ communication scheme uses an open drain signal line, the $I^2C$ communication scheme is not suitable for application to long-distance communication. In order to solve such a problem, Patent Literature 1 proposes applying the $I^2C$ communication scheme to long-distance communication by using clock-stretching. The transceiver system disclosed in Patent Literature 1 includes a host device, a host-side transceiver device, a remote-side transceiver device, and a remote device.

In this transceiver system, communication based on the $I^2C$ communication scheme is performed between the host device (master device) and the host-side transceiver device (slave device), communication based on a communication scheme (for example, a serial communication scheme using a differential signal line) different from the $I^2C$ communication scheme is performed between the host-side transceiver device and the remote-side transceiver device, and communication based on the $I^2C$ communication scheme is performed between the remote-side transceiver device (master device) and the remote device (slave device). By doing so, it is possible to transmit an access request signal from the host device to the remote device via the host-side transceiver device and the remote-side transceiver device. A communication distance between the host-side transceiver device and the remote-side transceiver device may be several meters to tens of meters.

CITATION LIST

Patent Literature

[Patent Literature 1] U.S. Pat. No. 8,010,724

SUMMARY OF INVENTION

Technical Problem

In the transceiver system disclosed in Patent Literature 1, a clock-stretching state is established between the host device and the host-side transceiver device in order to cause the host device to wait before sending of the next access request signal to the remote device while a process according to the access request signal is being performed in the remote-side transceiver device or the remote device after the access request signal is sent from the host-side transceiver device to the remote-side transceiver device.

However, when another slave device is connected to the host device (master device) in addition to the host-side transceiver device (slave device), a period in which the clock-stretching state is established also becomes a communication standby state between the host device and the other slave device. Since both devices perform communication after the clock-stretching state is canceled, it takes time until the communication is completed.

Further, the transceiver system described in Patent Literature 1 cannot be realized using a host device that does not support the clock-stretching specification.

The above problem exists not only in the $I^2C$ communication scheme, but also in an in-device data bus communication scheme such as a serial peripheral interface (SPI) communication scheme.

The present invention has been made in order to solve the above problem, and an object of the present invention is to provide a host-side transceiver system and a transceiver system capable of shortening a time for completing communication between a host device and another slave device when the other slave device is connected to the host device, in addition to a host-side transceiver device.

Solution to Problem

A host-side transceiver device of the present invention is a host-side transceiver device that receives, from a host device, an access request signal for requesting access to a remote device from the host device and sends the access request signal to a remote-side transceiver device that performs communication with the remote device, and includes a first communication unit that performs communication based on an in-device data bus communication scheme with the host device and receives the access request signal sent from the host device; and a second communication unit that performs communication based on a communication scheme different from the in-device data bus communication scheme with the remote-side transceiver device, and sends the access request signal received by the first communication unit to the remote-side transceiver device. Further, the first communication unit sends a reception notification signal for notifying that the first communication unit has received the access request signal sent from the host device, to the host device, before the access to the remote device based on the access request signal sent from the second communication unit ends.

In the host-side transceiver device of the present invention, when the second communication unit has received, from the remote-side transceiver device, an end notification signal for notifying that the access to the remote device based on the access request signal sent from the second communication unit has ended, the first communication unit notifies the host device that the end notification signal has been received.

A transceiver system of the present invention includes a host device, the host-side transceiver device according to such an aspect that performs communication based on an in-device data bus communication scheme with the host device, a remote-side transceiver device that performs communication based on a communication scheme different from the in-device data bus communication scheme with the host-side transceiver device, and a remote device that performs communication with the remote-side transceiver device, wherein the host device sends an access request signal for requesting access to the remote device to the host-side transceiver device, the host-side transceiver device receives the access request signal sent from the host device and sends the access request signal to the remote-side transceiver device, the remote-side transceiver device receives the access request signal sent from the host-side transceiver device and sends the access request signal to the remote device, and the remote device receives the access request signal sent from the remote-side transceiver device and performs a process according to the access request indicated by the access request signal.

Advantageous Effects of Invention

According to the present invention, it is possible to shorten a time for completing communication between the host device and another slave device when the other slave device is connected to the host device in addition to the host-side transceiver device. Further, even when an I²C compliant host device that does not support a clock-stretching specification is used, it is possible to realize a transceiver system.

DESCRIPTION OF EMBODIMENTS

Hereinafter, embodiments of the present invention will be described in detail with reference to the accompanying drawings. In description of the drawings, the same elements are denoted by the same reference signs, and repeated description will be omitted.

Figure 1:
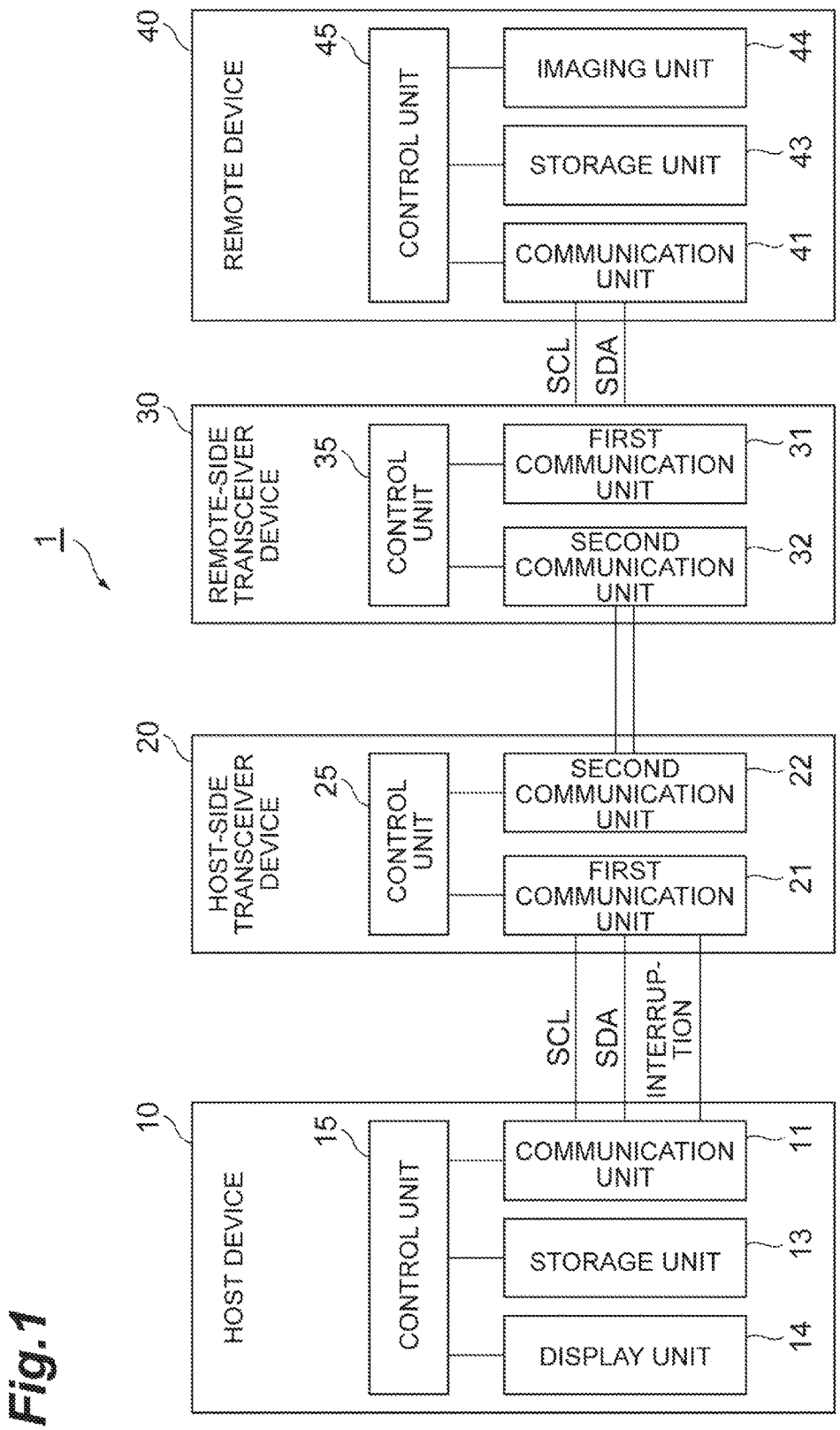
FIG. 1 is a diagram illustrating a configuration of a transceiver system 1 of an embodiment.

FIG. 1 is a diagram illustrating a configuration of a transceiver system 1 according to this embodiment. The transceiver system 1 includes a host device 10, a host-side transceiver device 20, a remote-side transceiver device 30, and a remote device 40.

The host device 10 sends an access request signal for requesting access to the remote device 40 to the host-side transceiver device 20. The host-side transceiver device 20 receives the access request signal sent from the host device 10 and sends the access request signal to the remote-side transceiver device 30. The remote-side transceiver device 30 receives the access request signal sent from the host-side transceiver device 20 and sends the access request signal to the remote device 40. The remote device 40 receives the access request signal sent from the remote-side transceiver device 30 and performs a process according to an access request indicated by the access request signal.

Between the host device 10 and the host-side transceiver device 20, the host device 10 serves as a master device and the host-side transceiver device 20 serves as a slave device, and transmission and reception of the access request signal is performed through communication based on an I²C communication scheme. Between the host-side transceiver device 20 and the remote-side transceiver device 30, transmission and reception of the access request signal is performed through communication based on a communication scheme different from the I²C communication scheme. Between the remote-side transceiver device 30 and the remote device 40, the remote-side transceiver device 30 becomes a master device and the remote device 40 becomes a slave device, and transmission and reception of the access request signal are performed through the communication based on the I²C communication scheme.

A communication scheme capable of long-distance signal transfer is used as the communication scheme between the host-side transceiver device 20 and the remote-side transceiver device 30, and it is preferable for a signal to be transferred using a serial communication scheme using a differential signal line. A length of a signal line between the host device 10 and the host-side transceiver device 20 is about 1 m or less. A length of a signal line between the remote-side transceiver device 30 and the remote device 40 is also about 1 m or less. A length of the signal line between the host-side transceiver device 20 and the remote-side transceiver device 30 can be several meters to tens of meters.

When the access request to the remote device 40 is data writing, the access request signal (write request signal) sent from the host device 10 to the remote device 40 is accompanied by an address indicating a data write position in the remote device 40 and data to be written. When the access request to the remote device 40 is data reading, the access request signal (read request signal) sent from the host device 10 to the remote device 40 is accompanied by an address indicating a data read position in the remote device 40. Data read from the remote device 40 that has received the read request signal is sent to the host device 10 via a path reverse to a path of the read request signal.

The transceiver system 1 according to this embodiment sends image data obtained by imaging using an imaging unit 44 of the remote device 40 to the host device 10, and displays the image on the display unit 14 of the host device. The host device 10 includes a communication unit 11, a storage unit 13, a display unit 14, and a control unit 15. The host-side transceiver device 20 includes a first communication unit 21, a second communication unit 22, and a control unit 25. The remote-side transceiver device 30 includes a first communication unit 31, a second communication unit 32, and a control unit 35. The remote device 40 includes a communication unit 41, a storage unit 43, an imaging unit 44, and a control unit 45.

The communication unit 11 of the host device 10 and the first communication unit 21 of the host-side transceiver device 20 are connected by two bidirectional open drain signal lines (an SCL line and an SDA line) pulled up by a resistor, and can perform communication based on the I²C communication scheme. The second communication unit 22 of the host-side transceiver device 20 and the second communication unit 32 of the remote-side transceiver device 30 are connected by differential signal line and can perform long-distance communication. The first communication unit 31 of the remote-side transceiver device 30 and the communication unit 41 of the remote device 40 are connected by two bidirectional open drain signal lines (an SCL line and an SDA line) pulled up by a resistor, and can perform communication based on the I²C communication scheme. Via the signal lines, an access request signal for requesting access to the remote device 40 is sent from the host device 10 to the remote device 40, and data read from the remote device 40 based on the read request signal is sent from the remote device 40 to the host device 10.

Image data obtained by imaging using the imaging unit 44 of the remote device 40 is sent from the remote device 40 to the host device 10 via the differential signal line. This image data may be sent directly from the remote device 40 to the host device 10 or may be sent via the remote-side transceiver device 30 and the host-side transceiver device 20. In the latter case, the image data may be sent as a parallel signal from the remote device 40 to the remote-side transceiver device 30, sent as a serial signal from the remote-side transceiver device 30 to the host-side transceiver device 20 via the differential signal line, and sent as a parallel signal from the host-side transceiver device 20 to the host device 10.

The communication unit 11 of the host device 10 performs communication based on the I²C communication scheme with the first communication unit 21 of the host-side transceiver device 20, sends an access request signal for requesting access to the remote device 40 to the first communication unit 21 of the host-side transceiver device 20, and receives the data read from the remote device 40 from the first communication unit 21 of the host-side transceiver device 20. The storage unit 13 stores data to be sent to the remote device 40, data sent from the remote device 40, and the like. The display unit 14 displays an image based on the image data sent from the remote device 40. The control unit 15 controls operations of the communication unit 11, the storage unit 13, and the display unit 14.

The first communication unit 21 of the host-side transceiver device 20 performs communication based on the I²C communication scheme with the communication unit 11 of the host device 10, and receives the access request signal sent from the communication unit 11. The second communication unit 22 of the host-side transceiver device 20 communicates with the second communication unit 32 of the remote-side transceiver device 30 and sends the access request signal received by the first communication unit 21 to the second communication unit 32. Further, the second communication unit 22 receives the data read from the remote device 40 from the second communication unit 32 of the remote-side transceiver device 30. The first communication unit 21 sends the data received by the second communication unit 22 to the communication unit 11 of the host device 10. The control unit 25 controls operations of the first communication unit 21 and the second communication unit 22. When formats of the access request signal or the data transmitted and received by the first communication unit 21 and the second communication unit 22 are different, the control unit 25 converts the format of the access request signal or the data.

The second communication unit 32 of the remote-side transceiver device 30 communicates with the second communication unit 22 of the host-side transceiver device 20 and receives the access request signal sent from the second communication unit 22. The first communication unit 31 of the remote-side transceiver device 30 performs communication based on the I²C communication scheme with the communication unit 41 of the remote device 40 and sends the access request signal received by the second communication unit 32 to the communication unit 41. Further, the first communication unit 31 receives the data read from the remote device 40, from the communication unit 41 of the remote device 40. The second communication unit 32 sends the data received by the first communication unit 31 to the second communication unit 22 of the host-side transceiver device 20. The control unit 35 controls operations of the first communication unit 31 and the second communication unit 32. When formats of the access request signal or the data transmitted and received by the first communication unit 31 and the second communication unit 32 are different, the control unit 35 converts the format of the access request signal or the data.

The communication unit 41 of the remote device 40 performs communication based on the I²C communication scheme with the first communication unit 31 of the remote-side transceiver device 30, and receives the access request signal sent from the first communication unit 31. Further, the communication unit 41 of the remote device 40 sends the data read out from the storage unit 43 to the first communication unit 31 when the access request signal is a read request. The storage unit 43 stores various pieces of data regarding an imaging operation or an image data output operation of the imaging unit 44. The data stored in the storage unit 43 designates, for example, the number of pixels, a gradation, a frame rate, or the like when the imaging unit 44 performs imaging or when the imaging unit 44 outputs image data. When the access request signal received by the communication unit 41 is a write request, the storage unit 43 stores data received together with the access request signal at a predetermined address. When the access request signal received by the communication unit 41 is a read request, the storage unit 43 outputs data at a predetermined address. The imaging unit 44 includes, for example, a CCD camera, performs imaging, and outputs image data. The control unit 45 controls operations of the communication unit 41, the storage unit 43, and the imaging unit 44.

Before the access to the remote device 40 based on the access request signal sent from the second communication unit 22 to the remote-side transceiver device 30 ends, the first communication unit 21 of the host-side transceiver device 20 sends, to the host device 10, a reception notification signal (ACK signal) for notifying that the first communication unit 21 has received the access request signal sent from the communication unit 11 of the host device 10. The first communication unit 21 of the host-side transceiver device 20 may send the reception notification signal to the host device 10 before, simultaneously with, or immediately after a timing at which the access request signal is sent from the second communication unit 22 to the remote-side transceiver device 30.

Accordingly, it is possible to avoid a situation in which the I$^2$C communication between the host device 10 and the host-side transceiver device 20 enters a clock-stretching state, or it is possible to shorten a period of the clock-stretching state. When another slave device is connected to the host device 10 in addition to the host-side transceiver device 20, the host device 10 having received the reception notification signal from the host-side transceiver device 20 can perform I$^2$C communication with the other slave device.

Thus, in this embodiment, when the other slave device is connected to the host device 10 in addition to the host-side transceiver device 20, it is possible to shorten a time for completing communication between the host device 10 and the other slave device. Further, even when an I$^2$C compliant host device 10 that does not support a clock-stretching specification is used, the transceiver system 1 can be realized.

After the second communication unit 22 of the host-side transceiver device 20 sends the access request signal to the first communication unit 31 of the remote-side transceiver device 30, the second communication unit 22 of the host-side transceiver device 20 receives an end notification signal for notifying that the access to the remote device 40 based on the access request signal from the first communication unit 31 of the remote-side transceiver device 30 has ended. The first communication unit 21 of the host-side transceiver device 20 notifies the communication unit 11 of the host device 10 that the second communication unit 22 has received the end notification signal.

In this case, the notification from the first communication unit 21 of the host-side transceiver device 20 to the communication unit 11 of the host device 10 is performed through an interruption via a signal line different from the signal line for I$^2$C communication. Through this interruption, the host device 10 can recognize that the access to the remote device 40 has ended. When the access to the remote device 40 is data reading, the data read from the remote device 40 is sent together with the end notification signal to the host-side transceiver device 20, and therefore, the host device 10 subjected to the interruption can make the read request to the host-side transceiver device 20 through I$^2$C communication and acquire the data from the host-side transceiver device 20.

Next, an operation example of each of the read request and the write request in the transceiver system 1 of this embodiment will be described.

Figure 2:
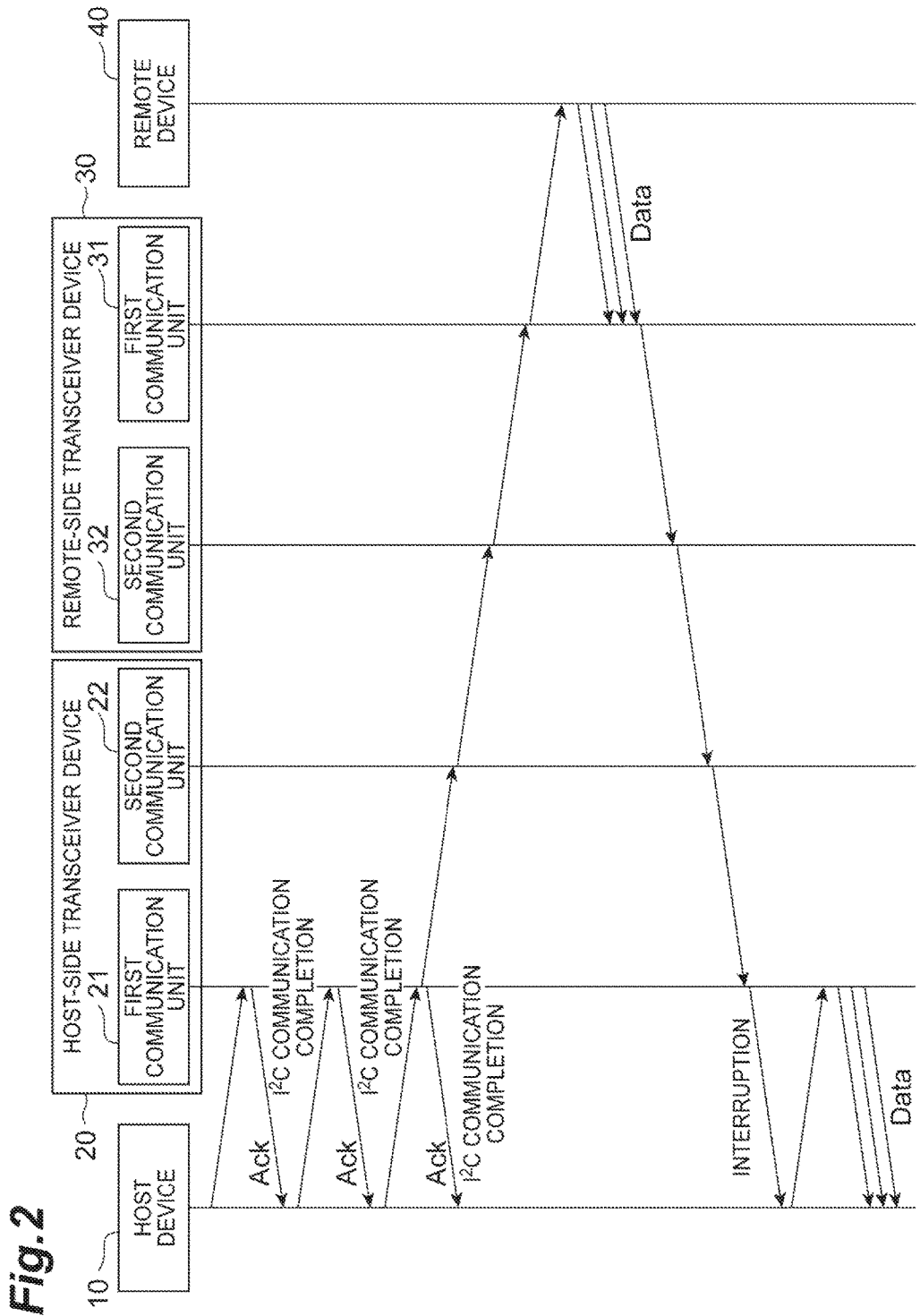
FIG. 2 is a diagram illustrating an operational sequence example of a read request from a host device 10 to a remote device 40 in the transceiver system 1 of this embodiment.

FIG. 2 is a diagram illustrating an operation sequence example of the read request from the host device 10 to the remote device 40 in the transceiver system 1 of this embodiment.

First, a read request signal for requesting data reading from the remote device 40 is sent together with an address indicating a data read position in the remote device 40 from the communication unit 11 of the host device 10 to the first communication unit 21 of the host-side transceiver device 20. When the host-side transceiver device 20 receives the read request signal, a reception notification signal (ACK) for notifying that the read request signal has been received is sent from the first communication unit 21 of the host-side transceiver device 20 to the communication unit 11 of the host device 10. In this case, a device address of the remote device 40, the number of bytes of data to be read from the remote device 40, and a first address at which the access to the remote device 40 starts are sent from the communication unit 11 of the host device 10 to the first communication unit 21 of the host-side transceiver device 20, and an instruction to start the access is sent. Accordingly, since the I$^2$C communication between the host device 10 and the host-side transceiver device 20 is completed first, a clock-stretching state is not established between these devices.

Further, the read request signal is sent together with the address from the second communication unit 22 of the host-side transceiver device 20 to the second communication unit 32 of the remote-side transceiver device 30. Further, the read request signal is sent together with the address from the first communication unit 31 of the remote-side transceiver device 30 to the communication unit 41 of the remote device 40.

The remote device 40 having received the read request signal reads the data from the storage position in the storage unit 43 indicated by the address that has been received together with the read request signal. In this case, the remote device 40 reads the indicated number of bytes of data from the indicated first address. A reception notification signal (ACK) for notifying that the read request signal has been received and the data reading has ended is sent together with the read data from the communication unit 41 of the remote device 40 to the first communication unit 31 of the remote-side transceiver device 30.

When the remote-side transceiver device 30 receives the reception notification signal (ACK) and the data, an end notification signal for notifying that the data reading in the remote device 40 has ended and the data are sent from the second communication unit 32 of the remote-side transceiver device 30 to the second communication unit 22 of the host-side transceiver device 20. When the host-side transceiver device 20 receives the end notification signal and the data, the first communication unit 21 of the host-side transceiver device 20 notifies the communication unit 11 of the host device 10 that the end notification signal and the data have been received through interruption. Accordingly, the host device 10 can recognize that the data reading from the remote device 40 has ended and that the data read from the remote device 40 has been received by the host-side transceiver device 20.

The read request signal for requesting data reading from the host-side transceiver device 20 is sent from the communication unit 11 of the host device 10 to the first communication unit 21 of the host-side transceiver device 20 together with an address indicating a data read position in the host-side transceiver device 20. When the host-side transceiver device 20 receives the read request signal, the reception notification signal (ACK) for notifying that the read request signal has been received is sent from the first communication unit 21 of the host-side transceiver device 20 to the communication unit 11 of the host device 10 together with the read data.

An example of an operation sequence of a write request from the host device 10 to the remote device 40 in the transceiver system 1 of this embodiment is as follows.

First, a write request signal for requesting data writing to the remote device 40 is sent together with an address indicating a data write position in the remote device 40 and data to be written, from the communication unit 11 of the host device 10 to the first communication unit 21 of the host-side transceiver device 20. When the host-side transceiver device 20 receives the write request signal, the first communication unit 21 of the host-side transceiver device 20 sends a reception notification signal (ACK) for notifying that the write request signal has been received, to the communication unit 11 of the host device 10. Accordingly, since the I²C communication between the host device 10 and the host-side transceiver device 20 is completed first, a clock-stretching state is not established between these devices.

Further, the write request signal is sent together with the address and the data from the second communication unit 22 of the host-side transceiver device 20 to the second communication unit 32 of the remote-side transceiver device 30. Further, the write request signal is sent together with the address and the data from the first communication unit 31 of the remote-side transceiver device 30 to the communication unit 41 of the remote device 40.

The remote device 40 having received the write request signal writes the received data to the storage position in the storage unit 43 indicated by the address that has been received together with the data. Further, a reception notification signal (ACK) for notifying that the write request signal has been received and the data writing has ended is sent from the communication unit 41 of the remote device 40 to the first communication unit 31 of the remote-side transceiver device 30.

When the remote-side transceiver device 30 receives the reception notification signal (ACK), the end notification signal for notifying that data reading in the remote device 40 has ended is sent from the second communication unit 32 of the remote-side transceiver device 30 to the second communication unit 22 of the host-side transceiver device 20. When the host-side transceiver device 20 receives the end notification signal, the first communication unit 21 of the host-side transceiver device 20 notifies the communication unit 11 of the host device 10 that the end notification signal has been received through an interruption. Accordingly, the host device 10 can recognize that the data writing to the remote device 40 has ended.

In the above embodiment, the I²C communication scheme is used as the in-device data bus communication scheme, but an SPI communication scheme or the like may be used instead of the I²C communication scheme. In a case of a more general data bus communication scheme, it is possible to realize data transmission and reception to and from the remote device by appropriately ending the communication between the host device and the host-side transceiver device.

For example, even in the case of the SPI communication scheme, the host device may not be able to acquire the data read from the remote device immediately after sending the read request to the host-side transceiver device. However, dummy data may first be returned from the host-side transceiver device to the host device, and an interruption may be generated from the host-side transceiver device to the host device when the data read from the remote device arrives at the host-side transceiver device. Accordingly, the host device can acquire, from the host-side transceiver device, the data read from the remote device. Thus, a procedure of first ending the access request on the host side can be applied to a more general in-device data bus communication scheme.

Further, in the above embodiment, an interruption is performed on the host device from the host-side transceiver device, and the host device is notified that the data read from the remote device has arrived at the host-side transceiver device. However, when a certain period of time has elapsed from a time at which the read request has been sent from the host device to the host-side transceiver device, a flag may be set to ON in the host-side transceiver device and the host device may perform reading based on polling with respect to the host-side transceiver device or a read request may be sent from the host device to the host-side transceiver device without a notification. In these cases, it is possible to similarly realize data transmission and reception to and from the remote device.

INDUSTRIAL APPLICABILITY

The present invention is applicable to a use of a host-side transceiver system and a transceiver system capable of shortening a time for completing communication between a host device and another slave device when the other slave device is connected to the host device, in addition to a host-side transceiver device.

REFERENCE SIGNS LIST

1 Transceiver system
10 Host device
11 Communication unit
13 Storage unit
14 Display unit
15 Control unit
20 Host-side transceiver device
21 First communication unit
22 Second communication unit
25 Control unit
30 Remote-side transceiver device
31 First communication unit
32 Second communication unit
35 Control unit
40 Remote device
41 Communication unit
43 Storage unit
44 Imaging unit
45 Control unit

The invention claimed is:

1. A host-side transceiver device that receives, from a host device, an access request signal for requesting access to a remote device from the host device and sends the access request signal to a remote-side transceiver device that performs communication with the remote device, the host-side transceiver device comprising:
a first communication unit that performs communication based on an in-device data bus communication scheme with the host device and receives the access request signal sent from the host device; and
a second communication unit that performs communication based on a communication scheme different from the in-device data bus communication scheme with the remote-side transceiver device, and sends the access request signal received by the first communication unit to the remote-side transceiver device,
wherein the first communication unit sends a reception notification signal for notifying that the first communication unit has received the access request signal sent from the host device, to the host device, before the access to the remote device based on the access request signal sent from the second communication unit ends;

wherein when the access request signal is a read request signal to the remote device, the read request signal requests reading data from the remote device.

2. The host-side transceiver device according to claim 1, wherein when the second communication unit has received, from the remote-side transceiver device, an end notification signal for notifying that the access to the remote device based on the access request signal sent from the second communication unit has ended, the first communication unit notifies the host device that the end notification signal has been received.

3. A transceiver system comprising:

a host device, the host-side transceiver device according to claim 1 that performs communication based on an in-device data bus communication scheme with the host device, a remote-side transceiver device that performs communication based on a communication scheme different from the in-device data bus communication scheme with the host-side transceiver device, and a remote device that performs communication with the remote-side transceiver device, wherein the host device sends an access request signal for requesting access to the remote device to the host-side transceiver device, the host-side transceiver device receives the access request signal sent from the host device and sends the access request signal to the remote-side transceiver device, the remote-side transceiver device receives the access request signal sent from the host-side transceiver device and sends the access request signal to the remote device, and the remote device receives the access request signal sent from the remote-side transceiver device and performs a process according to the access request indicated by the access request signal.

4. A transceiver system comprising:

a host device, the host-side transceiver device according to claim 2 that performs communication based on an in-device data bus communication scheme with the host device, a remote-side transceiver device that performs communication based on a communication scheme different from the in-device data bus communication scheme with the host-side transceiver device, and a remote device that performs communication with the remote-side transceiver device, wherein the host device sends an access request signal for requesting access to the remote device to the host-side transceiver device, the host-side transceiver device receives the access request signal sent from the host device and sends the access request signal to the remote-side transceiver device, the remote-side transceiver device receives the access request signal sent from the host-side transceiver device and sends the access request signal to the remote device, and the remote device receives the access request signal sent from the remote-side transceiver device and performs a process according to the access request indicated by the access request signal.

5. A host-side transceiver device that receives, from a host device, an access request signal for requesting access to a remote device from the host device and sends the access request signal to a remote-side transceiver device that performs communication with the remote device, the host-side transceiver device comprising:

a first communication unit that performs communication based on an in-device data bus communication scheme with the host device and receives the access request signal sent from the host device; and a second communication unit that performs communication based on a communication scheme different from the in-device data bus communication scheme with the remote-side transceiver device, and sends the access request signal received by the first communication unit to the remote-side transceiver device, wherein the first communication unit sends a reception notification signal for notifying that the first communication unit has received the access request signal sent from the host device, to the host device, before the access to the remote device based on the access request signal sent from the second communication unit ends; and wherein when the access request signal is a write request signal to the remote device, the write request signal requests writing data from the remote device.

* * * * *